United States Patent
Freeman et al.

(10) Patent No.: US 6,570,966 B1
(45) Date of Patent: May 27, 2003

(54) INTERMIXING DATA AND VOICE ON VOICE CIRCUITS

(75) Inventors: Michael Freeman, Calgary (CA); Stewart S. Schneider, Calgary (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/528,232

(22) Filed: Mar. 17, 2000

(51) Int. Cl.[7] .............................................. H04M 11/00
(52) U.S. Cl. ..................... 379/93.08; 379/52; 379/93.17
(58) Field of Search ........................... 379/93.08, 93.09, 379/52, 93.17, 93.21, 93.25, 93.26, 93.28

(56) References Cited

U.S. PATENT DOCUMENTS

| | | | | | |
|---|---|---|---|---|---|
| 5,493,609 | A | * | 2/1996 | Winseck, Jr. et al. | 379/96 |
| 5,583,922 | A | * | 12/1996 | Davis et al. | 379/96 |
| 6,108,406 | A | * | 8/2000 | Mitchell et al. | 379/93.25 |
| 6,263,073 | B1 | * | 7/2001 | Lai et al. | 379/386 |
| 6,304,642 | B1 | * | 10/2001 | Beamish et al. | 379/142.01 |
| 6,393,124 | B1 | * | 5/2002 | Tsai et al. | 379/142.01 |
| 6,404,868 | B1 | * | 6/2002 | Beamish et al. | 379/142.01 |

* cited by examiner

*Primary Examiner*—Stella Woo
(74) *Attorney, Agent, or Firm*—Gibbons, Del Deo, Dolan, Griffinger & Vecchione

(57) ABSTRACT

An intermixing data and voice device and method that includes a screen phone. The screen phone has a screen display, a microphone, a speaker, a muter, a detector, a generator, a sender and a receiver. The detector is configured and arranged to detect a CAS tone and the generator generates an acknowledgement message in response to detection of the CAS tone in the case of the screen phone of the consumer. The detector detects the acknowledgement messages and the generator generates queries for graphics and textual support in the case of the screen phone of the business. The muter mutes the microphone and the speaker in accordance with instructions from a controller. In the case of the screen phone of the consumer, muting may arise in response to detection of the CAS tone. In the case of the screen phone of the business, muting may arise in response to answering a phone call. The screen phone of the business generates and information package that is sent to the screen phone of the consumer where it is received and its data is displayed on a screen. Upon safe receipt, the screen phone of the consumer generates an acknowledgement message, which is detected by the screen phone of the business. In response to such generation and detection, the controller instructs the muter to cease muting the speaker and microphone, thereby enabling a resumption of audio conversation.

4 Claims, 6 Drawing Sheets

INTERMIXING DATA AND VOICE ON VOICE CIRCUITS

CROSS-REFERENCE TO RELATED PATENT APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The invention relates to enhancing a screen-phone by the addition of the text data transfer mechanism. Users of two of these terminals transfer textual is data from one keyboard to the screen of the other terminal during a regular voice call. There is no need to connect to a special server or have TTY operator see the text data sent by the transmitting terminal. As well, once the data burst is complete, normal voice conversation can be resumed.

2. Discussion of Related Art

Hearing impaired persons can communicate with others via existing telephone voice lines in various ways. They may use a special terminal and the service pack that consists of an operator who types one end of the conversation to be displayed on the special terminal. This is a costly solution involving people and special terminals. Other people in the household also cannot use the special terminal for a regular telephone.

Data transfer is available on some phones but is usually limited to directory transfers for example. It is not dynamic. That is the user cannot type something in and transmit that information. Also, this is a point to point data connection. One cannot move between voice and data in this same call.

ADSI (Type III) addresses voice and text data but one must again connect and be limited to a special ADSI server.

It would be desirable to intermix data and voice on voice circuits so that textual data can be transmitted and received on the screen-phone without the use of special servers or services and at anytime throughout a regular voice conversation. Thus, if there is a word or phrase that a hearing impaired user cannot understand from the other party during the course of a regular voice conversation, the other party can type in the word or phrase on the keyboard. The data will be transmitted to the receiving screen phone and be displayed for a period of time. Regular conversation can them be continued.

It would also be desirable for such intermix of data and voice on voice circuits to be used to send directory or caller list information from one phone to another. Further, it would be desirable to send information from one phone to another, for example to send a name and number or portion of an email message to another person. Further such an intermix of data and voice on voice circuits would not only be suitable for the hearing impaired, but also suited for transfer of messages, phone numbers or other textual information from one terminal to another while on a regular voice call.

BRIEF SUMMARY OF THE INVENTION

One aspect of the invention resides in an intermixing data and voice device and a method. The aspect concerns a screen phone that includes a screen display, a microphone, a speaker, a controller, a receiver of incoming messages, a detector of a CAS tone received by the receiver, a sender of outgoing messages, a generator of the outgoing messages to transmit to the sender, the generator being configured and arranged to generate an acknowledgement of detection of the CAS tone, a muter configured and arranged to mute the microphone and the speaker in response to detection of the CAS tone by the detector, the generator being configured and arranged to generator replies to received queries provided the microphone and the speaker are muted by the muter, the receiver being arranged and configured to receive as one of the incoming messages an information package containing data, the controller being arranged and configured to instruct the screen display to display the data.

Another aspect concerns a controller, a muter, a receiver, a sender, a detector and a generator. The muter is arranged and configured to mute a speaker and a microphone in response to the incoming phone call in accordance with instructions from the controller. The generator is configured and arranged to generate, in accordance with instructions from the controller, a CAS tone in response to an incoming phone call. The generator also makes queries about graphic support in response to receipt of an incoming acknowledgement message and queries about textual support in response to receipt of an incoming acknowledgement message that is negative. The generator generates an information package in response to receipt of a incoming acknowledgement message that is positive.

The sender is configured and arranged to send all that is generated by the generator as outgoing messages. The receiver is arranged and configured to receive incoming messages. The detector is configured and arranged to detect receipt by the receiver of each of the acknowledgment incoming messages. The controller is configured and arranged to instruct the muter to cease muting the microphone and the speaker in response to the detector detecting a further incoming message indicative of safe receipt of the information package.

BRIEF DESCRIPTION OF THE SEVERAL VIEWS OF THE DRAWING

For a better understanding of the present invention, reference is made to the following description and accompanying drawings, while the scope of the invention is set forth in the appended claims.

DETAILED DESCRIPTION OF THE INVENTION

During a conversion via two or more telephones or terminals connected together, a telephone or terminal will change from full-duplex voice to full-duplex data by issuing a CAS tone. Type II and Type III telephones conventionally support CAS-tone detection. The receiving telephones or terminals will mute the user's audio transceivers and issue an acknowledgement as per current Type II products. On receipt of one or more acknowledgements, the generating telephone or terminal will begin transmitting data. The data transfer is terminated with a voice command that will unmute the user's audio transducers and allow voice conversation to resume.

Type II and Type III telephones already support CAS-tone detection.

Figure 1:
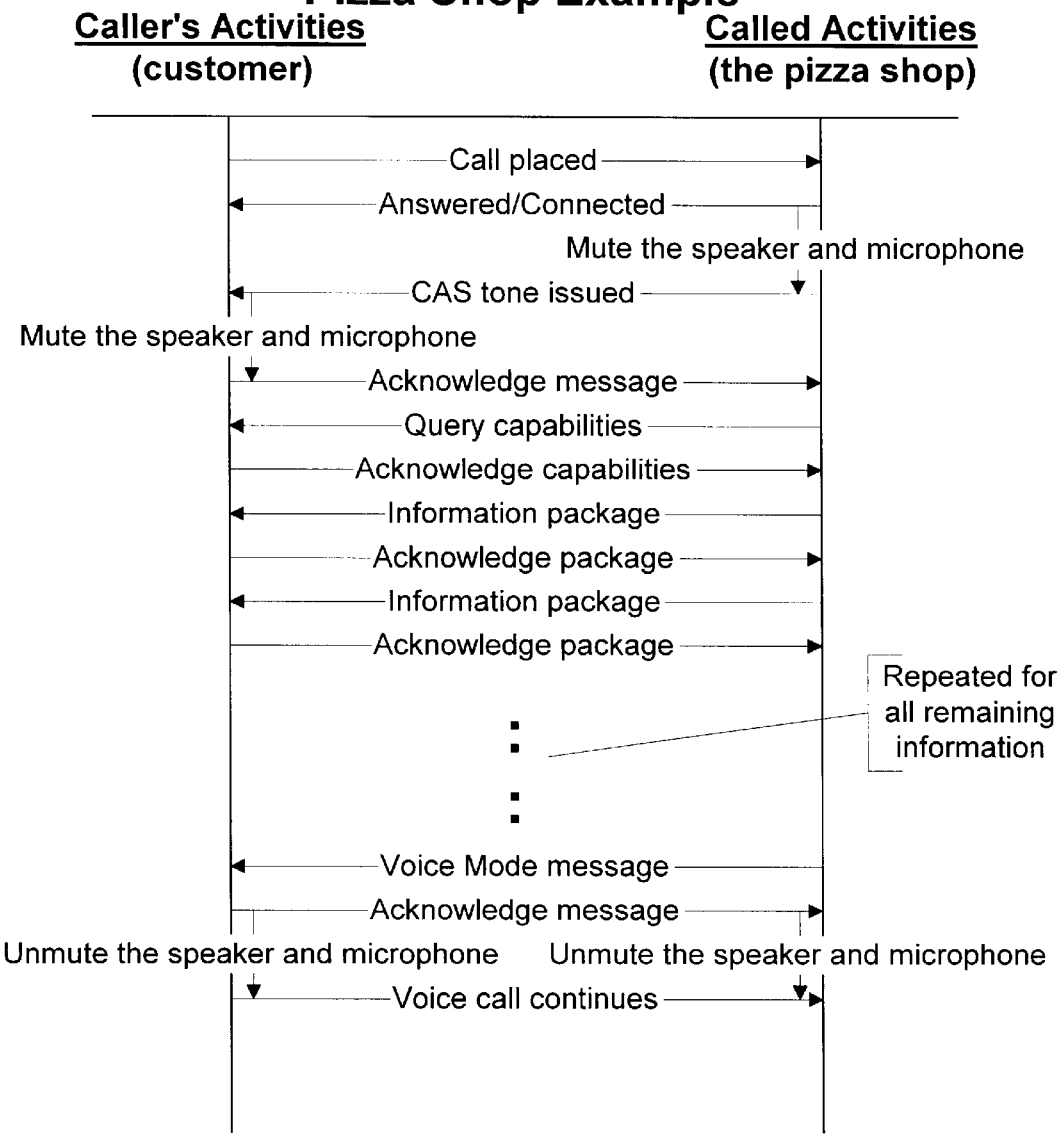
FIG. 1 is a schematic view of an initial sequence of actions that arise in intermixing data and voice on voice circuits in a pizza shop example in accordance with an embodiment of the invention.

FIG. 1 shows a sequence of actions that arise in connection with intermixing data and voice on voice circuits of the invention in the case of placing an order at a pizza shop. The actions are either the caller's activities (customer) or the called party's activities (the pizza shop). Both the caller and called party has a screen phone, which may be considered a terminal in the following discussion.

The customer calls the local pizza shop to place an order. As soon as the pizza-shop terminal answers, the terminal issues a CAS tone to request a change in modes from voice mode to data mode. The caller's terminal acknowledges this request and mutes the caller's audio transducers. If at any point of the transfer, any participant fails to acknowledge or does not support the requirements, audio mode is immediately restored.

Figure 2:
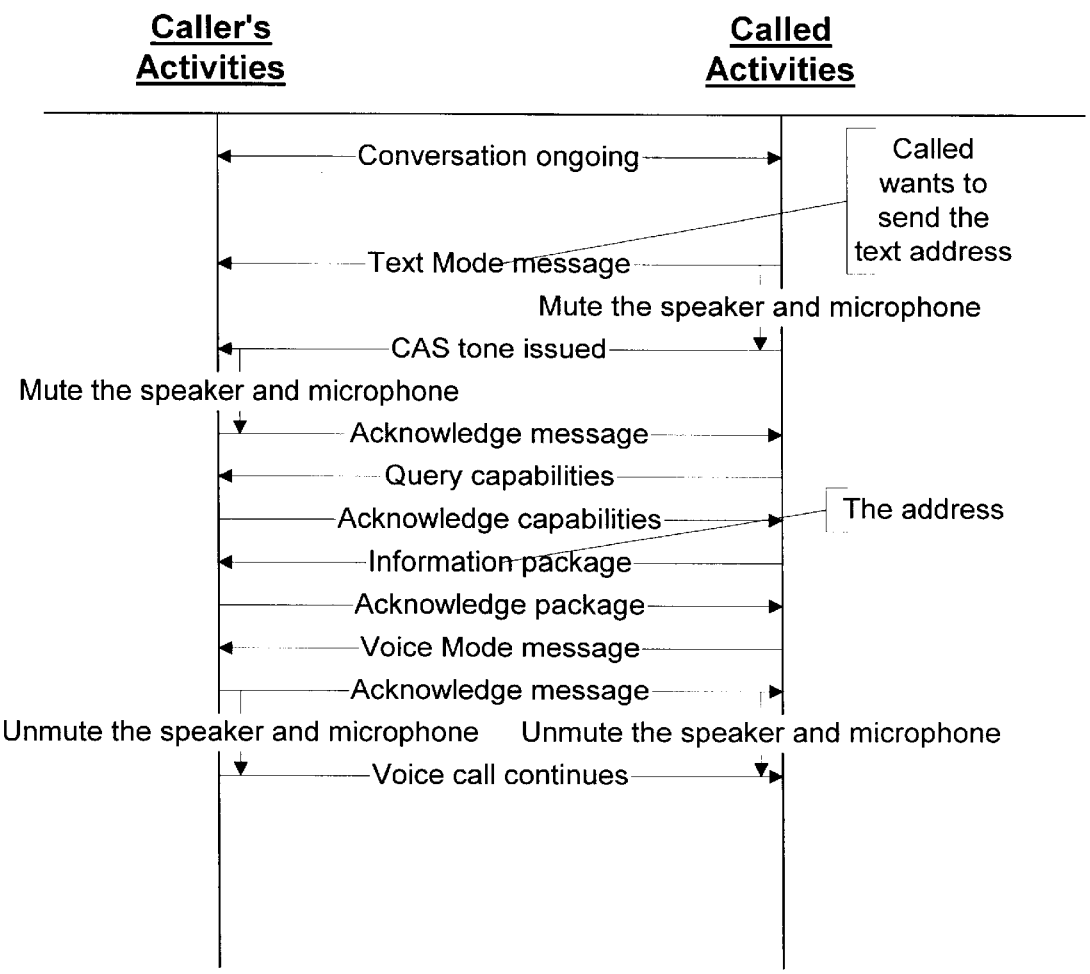
FIG. 2 is a schematic an initial sequence of actions that arise in intermixing data and voice on voice circuits in a hearing impaired example in accordance with an further embodiment of the invention.

FIG. 2 shows a sequence of actions that arise in connection with intermixing data and voice on voice circuits of the invention in the case of hearing impaired. The sequence is the same as in FIG. 1, except that a phone conversation is ongoing before the called party tries to send a text mode message that will require muting the speaker and microphone.

Figure 3A:
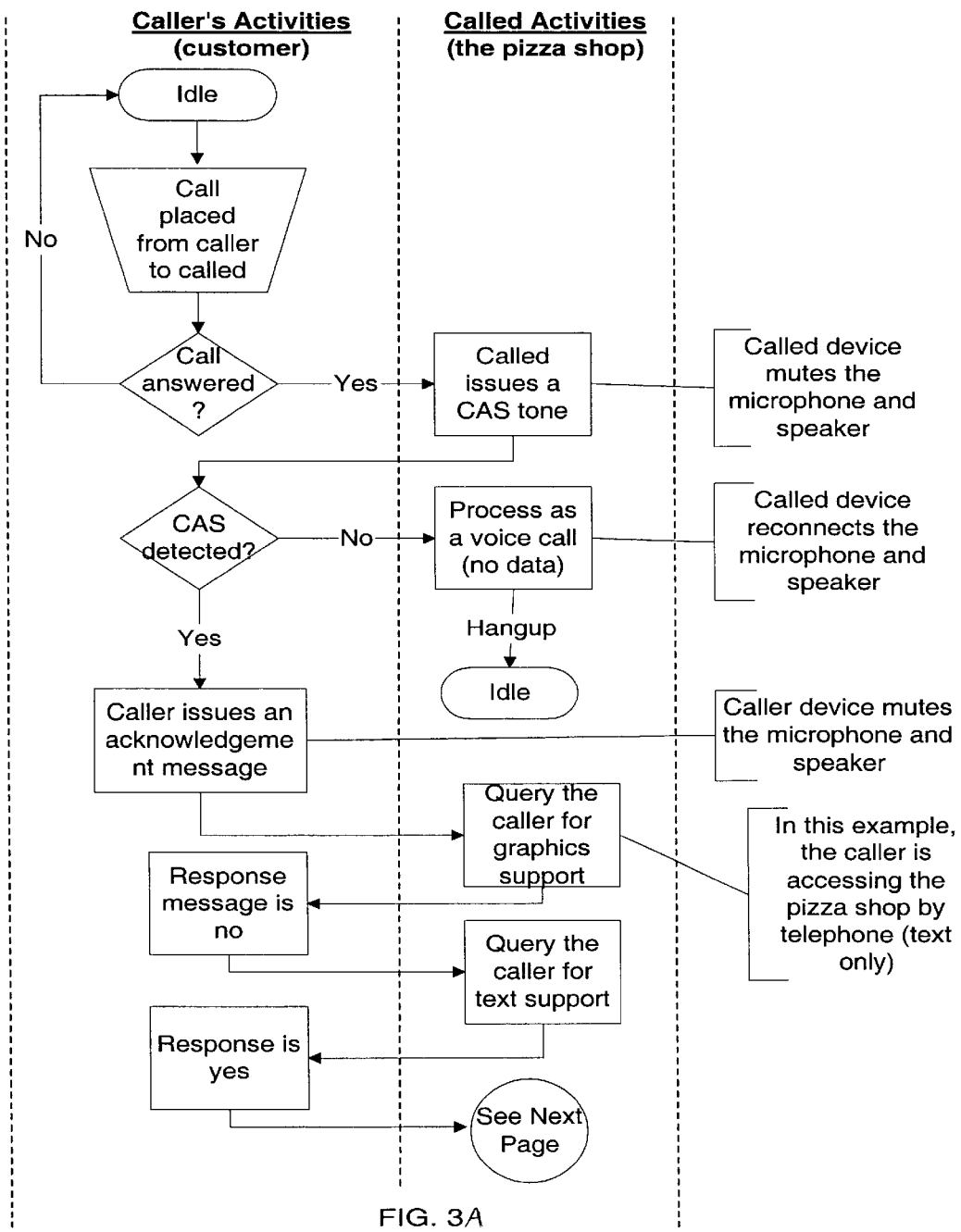
FIGS. 3A and 3B is a flow chart for performing the sequence of actions of FIG. 1.
Figure 3B:
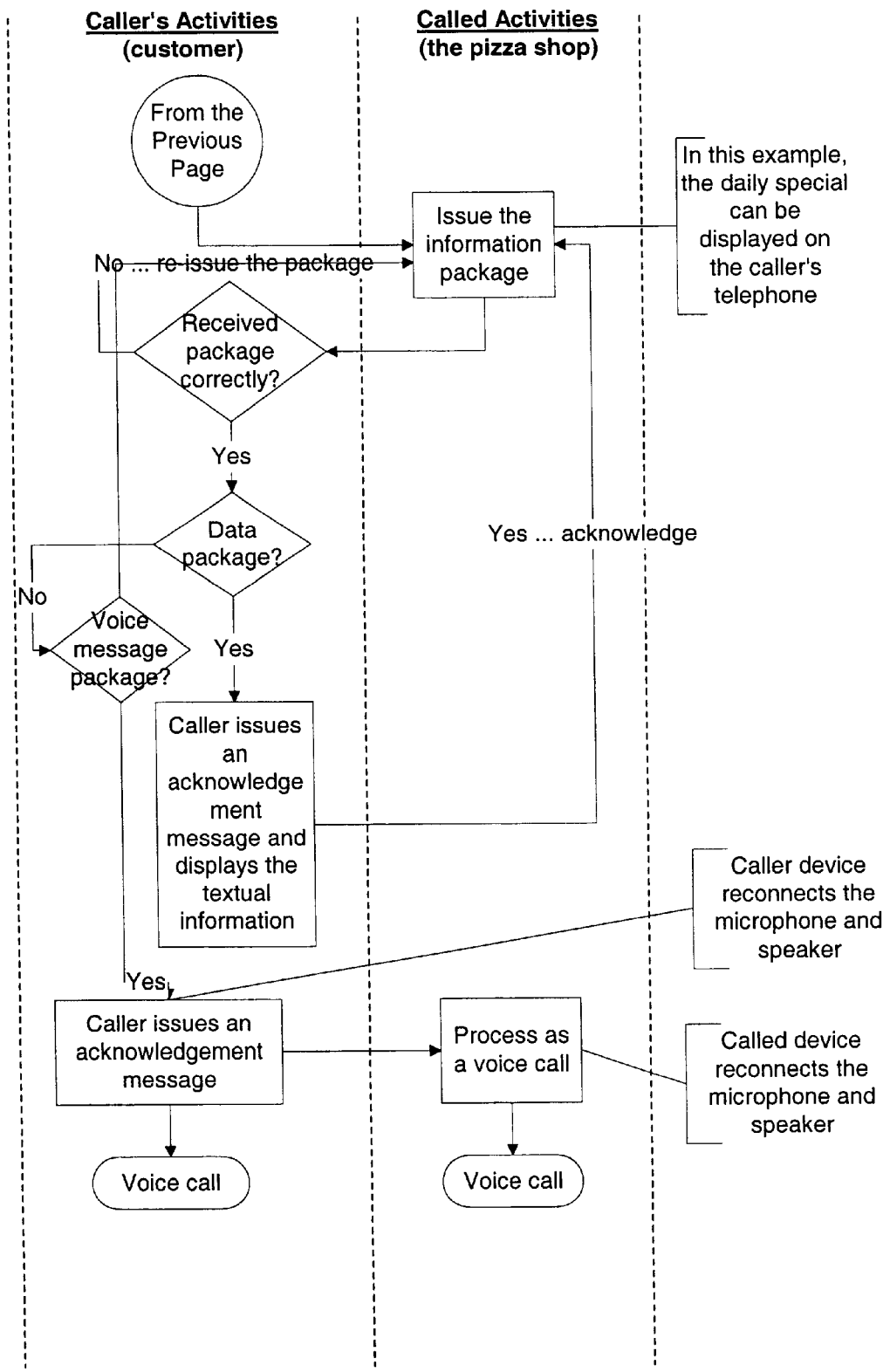

FIGS. 3A and 3B is a flow chart that identifies the caller's activities (customer) and the called party's activities (the pizza shop) based on the sequence of actions shown in FIG. 1. The capabilities of the participating terminals are negotiated. If the capabilities exist, an interactive HTML web page is transferred from the factory to the consumer terminal. A command is transferred from the factory to consumer terminal to terminate the data transfer and restore full-duplex audio. This allows audible marketing, voice prompting, or music on hold to follow while displaying the web page on the consumer's terminal. Now the consumer can view the menu on the terminal's screen while listening to a recorded advertisement.

The user may select the toppings, the type of pizza, pickup or delivery, or method of payment. Submission of this order from again follows the change in mode, negotiation of capabilities, transfer of information, and restoration of modes. The order is now complete without human intervention. If the initial CAS tone issued by the pizza-shop terminal is not acknowledged, however, the audio mode is restored and the pizza-shop terminal would behave as a standard telephone.

The invention uses conventional CAS-tone detection (Type II) capability of existing sets and also requires the addition of conventional CAS-tone generation. A display and keyboard would also be required to allow the entry and display of text information. Displays capable of displaying text exist on current Type III (ADSI) and other telephone products. The capability to enter text through a keyboard also exists on some telephone products such as the Nortel Networks Power Touch 470 residential telephone product.

Scenario

Two users with capable terminals talking on a normal phone call. User 1 uses a special key sequence on the keyboard to change to text mode. A prompt is displayed on User 1's display asking for a phrase or word or sentence. User 1 enters the data and terminates this mode with the keyboard's ENTER key. User 1's terminal then sends out a CAS tone. User 2's terminal sees the CAS tone, mutes the audio path, and ACKS it just (as in a Type II telephone). User 1's terminal sees the ACK, mutes it's audio path, and ACKS. User 1's terminal receives the ACK, mutes it's audio path, and sends the data. User 2's terminal sees that it is not Type II (caller ID) data but the new data type, and displays the text data typed in by User 1. The voice paths unmute and regular conversation is again established.

The invention disclosed here is to enhance a screen-phone by the addition of the text data transfer mechanism. The invention would allow the users of two of these terminals to transfer textual data from one keyboard to the screen of the other terminal during a regular voice call. There is no need to connect to a special server or have TTY operator intervention in order to see the text data sent by the transmitting terminal. As well, once the data burst is complete, normal voice conversation can be resumed.

A TYPE III compatible terminal means it can detect CAS tones and acknowledge these tones. It also has the capability of displaying Caller ID while on a call (spontaneous call waiting ID) or Type II. The proposed invention would use this existing TYPE II capability of the set but would also require the addition of CAS tone generation.

Scenario 2 users with these types of terminals talking on a normal phone call. User 1 hits a special key sequence on the keyboard. A prompt is displayed on screen asking User 1 to enter a phrase or word or sentence. User 1 enters the data and terminates with the Enter key. The user 1 terminal the sends out a CAS tone. User 2 terminal sees the CAS tone, mutes the audio path and ACKS it just as in TYPE II. User 1 terminal sees the ACK, mutes its audio path, and sends the data. User 2 terminal sees that is not a TYPE II data but the new data type, and displays the text data typed in by User 1. The voice paths unmute and regular conversation is again established.

Figure 4:
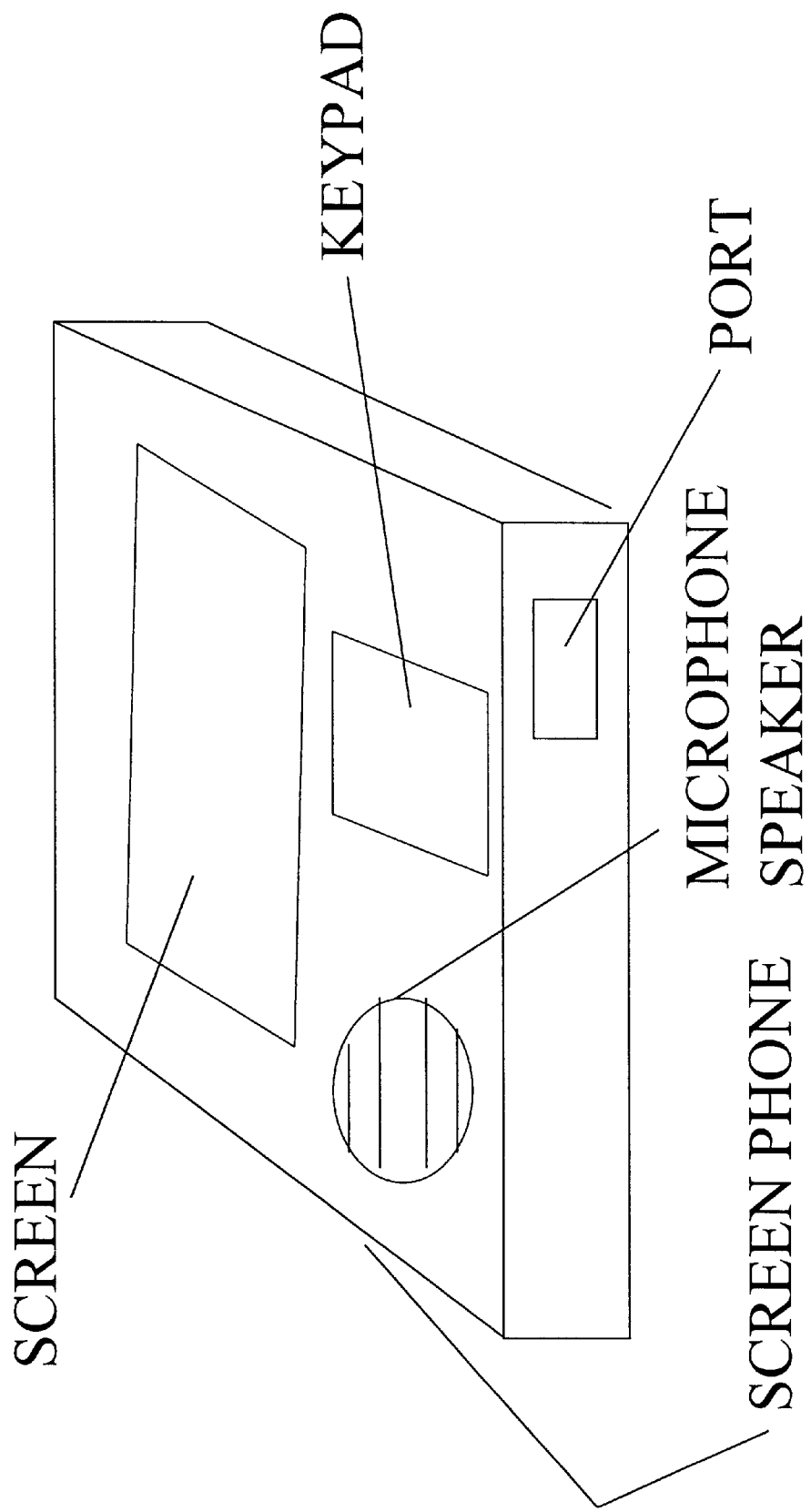
FIG. 4 is a schematic representation of a screen phone for carrying out the sequences of FIGS. 1–3.

FIG. 4 shows a screen phone that may be used in connection with the invention. The consumer would need to have the screen phone of FIG. 4 and the business would have the screen phone of FIG. 4. The screen phone has a screen, which is capable of displaying text and, preferably, graphics. A conventional speaker and microphone is used to effect audio communication. A port is used for connection with a phone jack connection cable as is commonly used with conventional screen phones.

Figure 5:
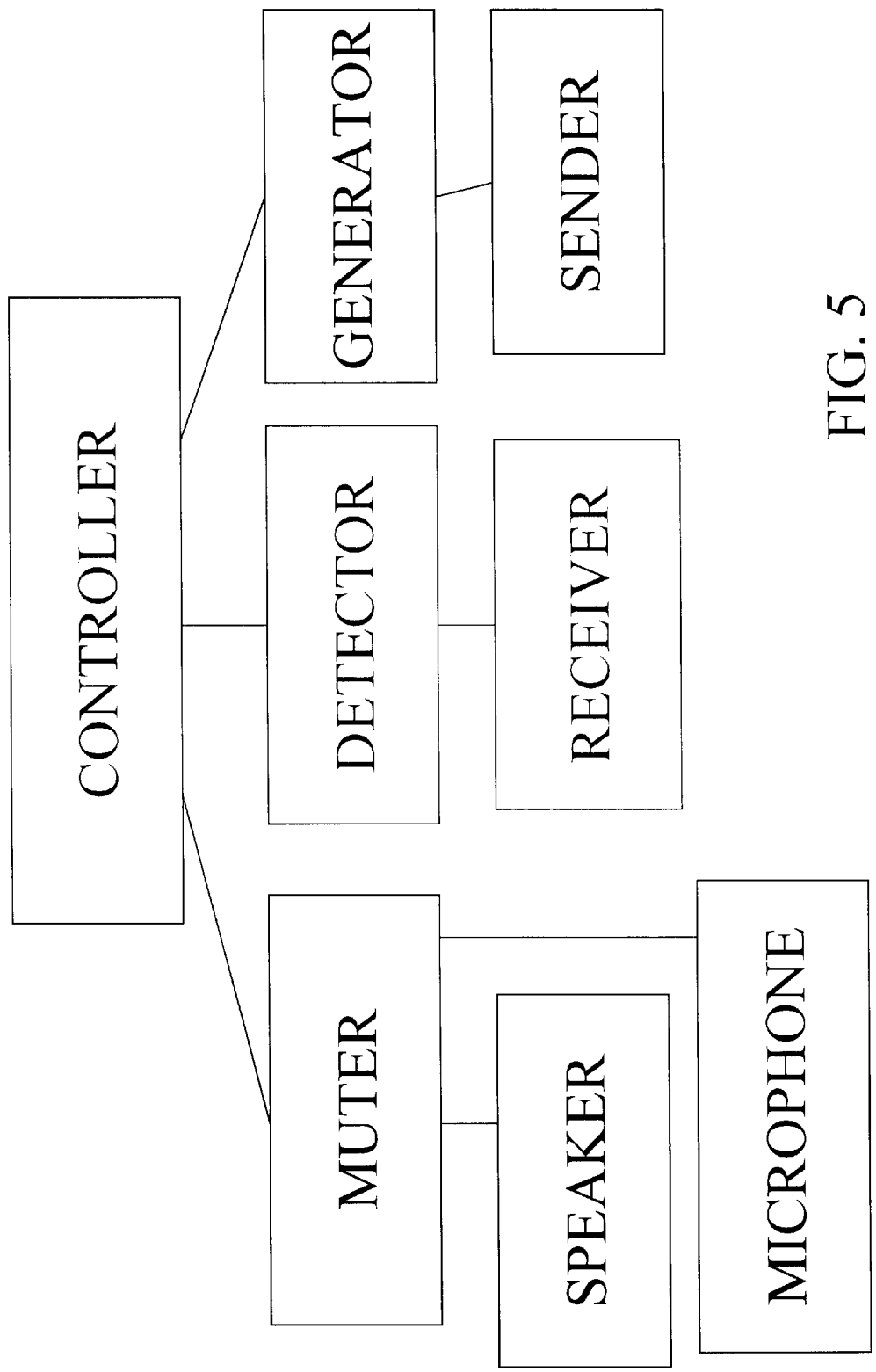
FIG. 5 is a schematic representation of circuitry within the screen phone of FIG. 4.

FIG. 5 shows in schematic form the circuitry within the screen phone of FIG. 4. The circuitry includes a controller, which transmits necessary instructions for carrying out the sequences shown in FIGS. 1–3 and which interprets received signals to send out the appropriate instructions as necessary. The controller instructs the muter to mute the speaker and microphone during the appropriate time in the sequence of FIGS. 1–3 and to send instructions later to cease muting the speaker and microphone at a time when muting is no longer required.

In the case of the consumer using the screen phone, the detector would be a detector of CAS tones. The generator would be the generator of an acknowledgement of detected CAS tones and a generator of replies to inquiries concerning graphical support and textual support and a generator of an acknowledgement signal that signifies safe receipt of an information package.

In the case of the business using the screen phone, the detector detects the aforementioned signals generated by the consumer's screen phone. The generator generates the signals received by the consumer's screen phone, namely, CAS tones, queries concerning graphical and textual support, and an information package.

While the foregoing description and drawings represent the preferred embodiment of the present invention, it will be understood that various changes and modifications may be made without departing from the spirit and scope of the present invention.

What is claimed is:

1. An intermixing data and voice device, comprising a screen phone that includes a screen display, a microphone, a speaker, a controller, a receiver of incoming messages, a detector of a CAS tone received by the receiver, a sender of outgoing messages, a generator of the outgoing messages to transmit to the sender, the generator being configured and arranged to generate an acknowledgement of detection of the CAS tone, a muter configured and arranged to mute the microphone and the speaker in response to detection of the CAS tone by the detector, the generator being configured and arranged to generate replies to received queries provided the microphone and the speaker are muted by the muter, the receiver being arranged and configured to receive as one of the incoming messages an information package containing data even if the information package includes as the data an interactive HTML web page, the screen phone also including a detector that is arranged and configured to detect a presence of data within the information package, the controller being arranged and configured to respond to detection of the data by the detector to instruct the screen display to display the data, the screen display being configured to display even the data that includes the interactive HTML web page if the information package includes the interactive HTML web page, the controller being arranged and configured to instruct that an acknowledgement of receipt of the information package be sent in response to receipt of the information package and to instruct the muter to cease muting the microphone and speaker in response to receipt of the information package by the receiver.

2. An intermixing data and voice device, comprising
a controller;
a muter arranged and configured to mute a speaker and a microphone in accordance with instructions from the controller;
a generator configured and arranged to generate, in accordance with instructions from the controller a CAS tone in response to an incoming phone call, queries about graphic support in response to receipt of an incoming acknowledgement message, queries about textual support in response to receipt of an incoming acknowledgement message that is negative, and an information package that includes data in response to receipt of a incoming acknowledgement message that is positive, the generator being capable of generating as the information package an interactive HTML web page;
a sender of all that is generated by the generator as outgoing messages;
a receiver of acknowledgement incoming messages; and
a detector configured and arranged to detect receipt by the receiver of each of the acknowledgment incoming messages, the controller being configured and arranged to instruct the muter to cease muting the microphone and the speaker in response to the detector detecting a further incoming message indicative of safe receipt of the information package, the controller being arranged and configured to send instructions to the muter, after the generator generates the queries to cease muting the microphone and speaker, in response to the receiver receiving the acknowledgement incoming message that is negative concerning the textual support.

3. A method of intermixing data and voice over voice circuits, comprising the steps of:

placing a phone call with a screen phone that includes a screen display, a microphone and a speaker;

detecting a CAS tone;

acknowledging detection of the CAS tone;

muting the microphone and the speaker in response to detection of the CAS tone;

receiving queries;

generating replies to the queries provided the microphone and speaker are muted;

receiving an information package containing data;

instructing the screen display to display the data;

sending an acknowledgement of receipt of the information package in response to the step of receiving the information package containing data;

ceasing the muting subsequent to the step of instructing; and displaying an interactive HTML web page on the screen display in response to the instructing, provided the interactive HTML web page is included with the data.

4. A method of intermixing data and voice over voice circuits comprising the steps of:

generating a CAS tone;

muting a speaker and a microphone;

generating a query about graphic support in response to receiving an acknowledgment message;

generating a query about textual support in response to receiving a negative acknowledgment message;

sending an information package that includes data in response to receiving a positive acknowledgment message even where the information package includes an interactive HTML web page as the data; and ceasing the muting of the microphone and the speaker in response to receiving a further acknowledgment message ceasing the muting of the microphone and the speaker in response to receiving and incoming acknowledge message that is negative after the query about textual support is generated ceasing the muting of the microphone and the speaker in response to receiving an incoming acknowledgement message that is negative after the query about textual support is generated.

* * * * *